United States Patent [19]
Takahashi et al.

[11] Patent Number: 4,971,727
[45] Date of Patent: * Nov. 20, 1990

[54] CONDUCTIVE PRIMER FOR PLASTICS OR CONDUCTIVE PRIMER SURFACER PAINT AND COATED PLASTICS MOLDED PRODUCTS

[75] Inventors: Katsuhiko Takahashi; Yoshiharu Suzuki; Haruyasu Ito, all of Fuji, Japan

[73] Assignee: Polyplastics Co., Ltd., Osaka, Japan

[*] Notice: The portion of the term of this patent subsequent to Oct. 25, 2005 has been disclaimed.

[21] Appl. No.: 398,321

[22] Filed: Aug. 28, 1989

Related U.S. Application Data

[63] Continuation of Ser. No. 226,244, Jul. 29, 1988, abandoned.

[30] Foreign Application Priority Data

Aug. 7, 1987 [JP] Japan ................................ 62-197503

[51] Int. Cl.$^5$ ............................... H01B 1/06

[52] U.S. Cl. .................... 252/511; 252/500; 252/518; 252/520; 252/512; 428/423.1; 428/425.1; 428/425.8; 428/425.9; 524/495; 524/496; 524/401; 524/439; 524/413; 524/432; 524/411; 523/448; 523/457; 523/460; 523/458; 523/468

[58] Field of Search ............... 252/511, 512, 518, 500; 524/495, 496, 411, 401, 413, 139, 432, 37, 38, 39, 41; 523/457, 448, 460, 458, 468; 428/423.1, 425.9, 425.1, 425.8, 424.2, 424.4; 226/244

[56] References Cited

U.S. PATENT DOCUMENTS

| 2,923,697 | 12/1975 | Ellis | 252/510 |
| 4,064,074 | 12/1977 | Ellis | 252/511 |
| 4,482,476 | 11/1984 | Yoshimura et al. | 252/511 |
| 4,547,311 | 10/1985 | Sako et al. | 252/500 |

FOREIGN PATENT DOCUMENTS 0085413 8/1983 European Pat. Off.
0255294 2/1988 European Pat. Off.

Primary Examiner—Josephine Barr
Attorney, Agent, or Firm—Nixon & Vanderhye

[57] ABSTRACT

An electrically conductive coating composition is useful for a primer or a surfacer paint for a plastic article, in particular one having a small polarity on the surface, and comprises (A) a polyurethane, (B) a spiro-orthoester resin of the ring-opening expansive property, (C) a cellulose derivative, (D) a hydroxy-containing surfactant and (E) an electrically conductive material.

4 Claims, No Drawings

CONDUCTIVE PRIMER FOR PLASTICS OR CONDUCTIVE PRIMER SURFACER PAINT AND COATED PLASTICS MOLDED PRODUCTS

This is a continuation of application Ser. No. 07/226,244, filed July 29, 1988, now abandoned.

The present invention relates to a conductive primer for plastics or a conductive primer surfacer paint which produces a highly adhesive coating on the surfaces of plastics having high crystallinity and small surface polarity and which gives excellent layer-adhesion to various finish coating paints, and to coated plastics molded products which are coated with the same.

[PRIOR ART]

Plastics which are highly crystalline or have small surface polarity, for example, polyacetal resin, polyester resins (polyethylene terephthalate, polybutylene terephthalate, fully aromatic polyester, etc.), etc., are normally subjected to physical or chemical surface treatments, before coatings are applied thereon, because of the paints' low adhesiveness. For example, a method of mechanically roughening the surface as a physical method, solvent treating method as a chemical method and flame treatment, ultraviolet ray treatment, corona discharge treatment, plasma treatment method, etc., as physical-chemical methods are finding general uses. All of these methods are intended to improve the adhesiveness of the paints by denaturing the plastic surfaces.

The methods of coating plastic surfaces after subjecting them to any physical or chemical treatments as hereabove described have serious difficulties due to for example, the increase labor (and thus increased costs required for the surface treatments, and the deteriorated of such surface-treated parts. Against this background, development of conductive primers or conductive primer surfacer paints which provide proper adhesiveness merely by direct static coating without requiring any surface treatment has been in progress and with some materials, practical applications have already been accomplished. Characteristics required of such a conductive primer or conductive primer surfacer paint are listed hereunder:

(1) It shall not attack the surface and the interior of plastics.

(2) Its coating's layer adhesive power shall be excellent (for example, not stripped by 1 mm 100 masu tape release test).

(3) It shall provide tough coating (shrinkage shall be small, and internal stress small, at the film forming time).

(4) It shall be quick drying, so that it permit finish-coating to be done by "wet-on-wet" way.

(5) Its coating shall be strong to physical impact (impact and chipping resistance), being highly flexible.

(6) Its coating shall be excellent in solvent, water (sticking) and heat resistance (including thermal cycle resistance).

(7) Static coating efficiency (coating efficiency, sticking-around property, etc.)

However, since plastics which are highly crystalline and which have little polarity have only a small affinity to almost all materials, it is not easy to achieve high coherence on them, without subjecting them to some surface treatment. Conductive primers or conductive primer surfacer paints which provide satisfactory coherence on polyacetal or polyester molded products, without subjecting them to some surface treatment, are therefor not currently available on the market.

The present invention has as its object, providing a conductive primer or conductive primer surfacer paint which is capable of fully exhibiting the above-mentioned required characteristics on plastics which are highly crystalline or have small surface polarity, and coated molded plastic products which are coated therewith.

(SUMMARY OF THE INVENTION)

The present invention is directed to a novel conductive primer or conductive primer surfacer paint which gives excellent coherence on plastics molded products, and to such coated plastics products on which a tough coating is formed at a high coating efficiency.

Thus the present invention relates to a conductive primer or conductive primer surfacer paint and coated plastics molded products which are coated therewith, the essential coating forming components of said primer or paint comprising:

(A) Polyurethane base resin, (B) Opening ring expansive spiro-ortho-ester base resin, (C) Cellulose derivative, (D) Hydroxyl group containing surface active agent, and (E) Conductive material.

The invention provides an electrically conductive coating composition for a primer or a surfacer paint for a plastic article which comprises (A) a polyurethane, (B) a spiro-ortho-ester resin of the ring-opening expansive property, (C) a cellulose derivative, (D) a hydroxy-containing surfactant and (E) an electrically conductive material.

The composition in which an electrically conductive material is not contained is disclosed in U.S. Pat. No. 4,780,340, which is incorporated hereinto.

As the component (A), which is characterized by high tackiness and high elasticity and which has a function of not only enhancing the paint's adherence on the object to be coated therewith, but elevating the coating's impact resistance, polyurethane base resins are used according to this invention. The polyurethane resin, as used here, is a generic word representing all denatured polyurethane resins, being any resins, so far as they have polyurethane resin as their main component material, whether they are thermoplastic or thermosetting. However, with a view to providing the coating with high tackiness and elasticity, they should be thermoplastic polyurethane base resins with mean molecular weights (Mn) ranging from about $2,000 \sim 10,000$, or more preferably from about $4,000 \sim 7,000$.

The component (B) mainly makes the coating non-shrinking, expands with cross-linked structure by undergoing intramolecular irreversible ring opening in the presence of a cationic catalyst, thereby playing a role of releaving the coating shrinkage at the film forming time, thus being a component which has the effects of not only releaving the outside stress, but retrenching the film's residual strain (internal stress) resulting from contraction, and which in addition, exhibits effective plastic effect even in its opened ring state. This component consists of spiro-orthoester base resins; 2,2-bis [4-(2,3-epoxy-propoxy) phenyl] propane 6-hexanolyd polyaddition product, 8, 10, 19, 20-tetraoxatrispiro (5,2,2,5,2,2) heneicosan -2,14-diene, etc., may be mentioned as representative examples. Of these compounds, preferable are spiro-ortho-ester base resins with degree of spiro-ortho-esterification degree 250~500 g/eq, preferably about 300~400 g/eq, and with epoxy values 0~5.0 g/eq, preferably about 4.65 g/eq.

The component (C) provides film forming property (thermal fluidity) and film hardness; it is composed of a cellulose derivative. Of cellulose derivatives, those adaptable for the purpose of this invention are cellulose esters such as cellulose acetate, cellulose propionate, cellulose butylate, cellulose acetate propionate, cellulose acetate butylate, cellulose nitrate, etc., particularly, with degree of butylation or propylation being 17~55%; cellulose acetate butylate and cellulose acetate propionate which are more highly butylated or propylated are preferable; their hydroxyl group concentration should be 1.0~3.0, preferably about 1.0, in number (per 4 anhydrous glucose units), and their viscosity should be 0.01~20.0 sec, preferably about 0.2 sec (standard falling-ball viscosity).

Component (D) should preferably be a fluorine or silicon base hydroxyl group containing reactive surface active agent having film surface adjusting ability and reactivity, which provides film surface adjustment and layer sticking to finish coating. As actual examples, hydroxyl group introduced perfluoro alkyl may be mentioned as fluorine base compound, and hydroxyl group introduced organosiloxane, etc., as a silicon base; both with high hydroxyl values are effective. Part of such hydroxyl groups are exposed from the coating surface, thereby providing the finish coating layer with proper sticking property.

Component (E) is a component for enabling static coating which is excellent in coating efficiency, as compared with such a way of coating as spraying, etc., to be made by making the coating conductive. As such a conductive material, for example, conductive carbon, conductive titanium, conductive zinc white, conductive antimony trichloride, graphite, fibrous or balloon shape or the like shape metal coating fillers, fibrous or the like shape metal powders and conductive adjusters may be mentioned.

These components A, B, C, D and E are integrally combined to form a coating which gives high coating performance, coating efficiency and sticking property on the object to be coated and finish coating paint.

According to this invention, the compounding proportions of these 5 components - (A) polyurethane base resin, (B) spiro-ortho-ester base resin, (C) cellulose derivative, (D) hydroxyl group containing surface active agent and (E) conductive material, being coating forming components - need to be so determined as to fall within the following composition ranges:

(A) Polyurethane base resin: 50~97 (% by weight)

(B) Spiro-ortho-ester base resin (containing a catalyst) :2.0~40 (% by weight)

(C) Cellulose derivative: 1.0~9.0 (% by weight)

(D) Hydroxyl group containing surface active agent : 0.05~1.0 (% by weight)

(E) Conductive material: An appropriate amount (surface resistance value less than $10^{13}$ Ωcm)

The reasons for determining the aforementioned composition ranges are as follows:

(A) If the polyurethane base resin is less than 50% by weight, the tacky layer which provides high stickiness lacks, resulting in shortage in stickiness, but if it is in excess of 97% by weight, atomization at the spraying time, surface flatness and surface hardness are extremely low.

(B) If the spiro-ortho-ester base resin is less than 2.0% by weight, neither expansiveness nor plasticity effect can not be achieved, so that the ability of following around mold product edge (corner or ridge) part is poor, but if it exceeds 40% by weight, stickiness suffers.

It should be noted that the ring-opening is brought about by cationic components in the system. Normally, the ring-opening reaction is promoted by coexistence of such a catalyst as methyl hexahydrophthalic anhydride, di-n-butyl-tin-dilaurate, etc.; such ring opening occurs under the influence of fillers having —COOH, —SO$_3$H groups, etc., or acidic hydroxyl groups, which exist in the system (aluminum silicate base, magnesium silicate base, surface carboxyl type organic form microgel, etc.). And excellent plastic effect in opened ring state also manifests itself. Since this ring-opening reaction is hard to take place at normal temperature, it is normally advisable to subject the coating as applied to a heat treatment at around 100° C. or promote the ring-opening reaction by making use of the heat evolved when baking a finish coating.

(C) If the cellulose derivative is less than 1.0% by weight, its effects on thermal fluidity and surface hardness are insufficient, but if it is in excess of 9.0% by weight, sticking property suffers.

(D) If the hydroxyl group containing reactive surface active agent is less than 0.05% by weight, the surface adjusting effect is not apparent, giving poor flatness of the coating surface, but if it exceeds 1.0% by weight, coating flaw (crator, etc.) appears and, moreover, stickiness to finish coating suffers.

(E) The compounding proportion of the conductive material varies with types of the conductive materials used. Thus it needs to be adjusted so that the surface resistance value of the plastic coated with a conductive primer or conductive primer surfacer paint should be lower than $10^{13}$ Ωcm. If this condition is met, effective static coating may be realized, but the surface resistance over $10^{13}$ Ωcm is undesirable; then, only the coating efficiency of the order obtained by the normal spraying method is attainable.

With said paint containing the aforementioned five components, a coating may be formed that provides the above-described required characteristics through reaction of particularly the components (B), (C) and (D) of those above-mentioned induced by subjecting it to a heat treatment after its coating. In this context, it is most advantageous to promote cross-linking of said coating composing components by taking advantage of the heat at the baking hardening time, using it in combination with a thermosetting type finish coating paint like baking paint, etc. It is of course possible, however, to subject said paint, after applied, to a heat treatment and, then, apply normal temperature setting type finish coating paint.

It is also practicable to apply normal temperature setting process in combination with a normal temperature setting finish coating paint, using the aforementioned components within their compounding ranges.

While with usual paint compositions, improvements in coating physical property reinforcement, ultraviolet ray transmission, coloring property, etc., are made by adding, as required, pigments, fillers or other various additives thereto, with the paint of this invention also, it is possible to further enhance the coating performance through compounding addition of a third component. It goes without saying, however, that account should be taken so as to assure its stable mixing with conductive primer or primer surfacer coating forming components (A), (B), (C), (D) and (E) in determining the type and compounding proportion of pigment, filler, etc.

The aforementioned coating forming components and a pigment or other additives mixed therewith as required are diluted with a solvent and mixed together, to provide a conductive primer or conductive primer surfacer paint. To be sure, this solvent shall not attack the plastics surface which is to be coated and should desirably be quick-drying; as the most general ones, those illustrated under the left column of Table 2 and their mixtures, etc., may be mentioned.

In adjusting a paint, taking account of the materials' grain sizes is desired, in order that of coating forming component and pigments and other additives, insoluble components may be uniformly dispersed in the solvent in the shape of fine grains of smaller than 10 $\mu$m. The conductive primer or conductive primer surfacer paint may be provided as solvent or dispersion type paint by appropriately adjusting the type and amount of the solvent used.

As the coating method, static coating with spray gun, disc, etc., is effective.

The coating, after applied, should be set by normal temperature drying and hot air drying for an arbitrary time period; in the case of hot air drying, appropriate conditions are at 40~140 °C. for 5~20 min. Appropriate dried coating thickness is 15~30 $\mu$m; the standard may be set at 22±2 $\mu$m.

[PREFERRED EMBODIMENT]

A conductive primer or conductive primer surfacer paint was prepared from each of the compositions shown in Table 1 which appear later, was diluted to adjust its concentration with each of viscous diluting solvents of the compositions listed in Table 2; this paint solution was coated to dry film thickness of 22±2 $\mu$m on a plate of polyacetal, polyethylene terephthalate, polybutylene terephthalate or fully aromatic polyester (composing monomer units:

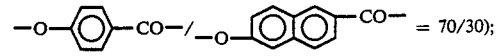

thereafter, this coating was hot-air dried at its temperature of 80~140 °C. for 20~30 min, thereby thermosetting the coating forming components. Then a melamine alkyd paint ("amilack" manufactured by Kansai Paint Co., Ltd.) which is available on the market generally for automobile outer boards was prepared with a thinner; this paint was coated on the plate by static coating to a dry film thickness of 30~40 $\mu$m and, after 10 min setting, hot-air-dried at 140° C. for 30 min, thereby effecting thermosetting.

The composition components listed under the left column in Table 1 designate the following materials:

Barnock : (A) Polyurethane base resin (manufactured by Dainihon Ink Chemical Co.)

exp-101 : (B) Spiro-ortho-ester base resin (catalyst: di-n-butyl-tin-dilaurate)(manufactured by Toa Synthetic Chemical Co.)

CAB-551-0.2: (C) Cellulose acetate butylate (manufactured by Eastman Kodak Co.)

Defenser
MCG-312: (D) Hydroxyl group containing silicon base reactive surface active agent (manufactured by Dainihon Ink Chemical Co.)

BYK No-370: (D) Hydroxyl group containing silicon base reactive surface active agent (manufactured by Bic Chemie Co.)

As conductive materials being the components (E) in Table 1, following materials were used:

Conductive titanium oxide (manufactured by Ishihara Industry Co.)

Conductive zinc oxide (manufactured by Hakusui Chemical Industries Co.)

Graphite (manufactured by Sumitomo Chemical Industries Co.)

Tertiary ammonium salts compounds (Yusho Co., Ltd.) (manufactured by Bic Chemie Co.)

TABLE 1

| Component (% by weight) | Example 1 | Example 2 | Example 3 | Example 4 | Example 5 | Example 6 |
|---|---|---|---|---|---|---|
| (A) Barnock | 62.6 | 47.2 | 46.1 | 44.9 | 42.8 | 40.6 |
| (B) Exp-101 | 12.6 | 10.2 | 9.9 | 9.6 | 9.1 | 8.5 |
| (C) CAB-551-0.2 | 2.3 | 3.8 | 3.6 | 3.3 | 2.9 | 2.3 |
| (D) Defenser MCF312 | — | 2.1 | — | — | 1.4 | — |
| (D) BYK No-370 | 0.2 | — | 2.0 | 1.8 | — | 0.9 |
| Rutile Titanium oxide | — | 6.0 | 9.0 | 12.0 | 18.0 | 22.9 |
| (E) Conductive titanium oxide | — | 9.2 | 8.3 | 7.3 | 5.5 | 3.7 |
| Zinc oxide | — | 1.1 | 1.6 | 2.1 | 3.2 | 4.2 |
| (E) Conductive zinc oxide | — | 3.3 | 3.0 | 2.7 | 2.0 | 2.1 |
| Magnesium silicate | — | 1.1 | — | — | 3.2 | 4.3 |
| Aluminum silicate | — | — | 1.6 | 2.1 | — | 0.2 |
| Carbon black | — | 0.1 | 0.1 | 0.1 | 0.1 | 5.6 |
| (E) Graphite | — | 14.0 | 12.6 | 11.2 | 8.4 | — |
| (E) Tertiary ammonium salts compounds | 20.0 | — | — | — | — | — |
| i-Butanol | 2.3 | 1.9 | — | 2.9 | 3.4 | 4.7 |
| n-Butanol | — | — | 2.2 | — | — | — |
| Total (excluding diluting solvent) | 100.0 | 100.0 | 100.0 | 100.0 | 100.0 | 100.0 |
| Surface resistance value ($\Omega$cm) | $3.3 \times 10^9$ | $3.2 \times 10^5$ | $5.0 \times 10^5$ | $1.9 \times 10^6$ | $3.0 \times 10^6$ | $2.2 \times 10^{12}$ |

TABLE 2

| Solvent | Diluting solvent mixing proportion (ratio by weight) | | | | | |
| --- | --- | --- | --- | --- | --- | --- |
|  | I | II | III | IV | V | IV |
| Methyl ethyl ketone | 30 | 30 | 30 | 50 | 30 | 30 |
| Methyl isobutyl ketone | 20 | 20 | — | — | — | 20 |
| i-Propanol | 20 | 15 | 45 | — | 20 | — |
| i-Butanol | — | — | — | 10 | — | — |
| Ethyl acetate | — | — | — | 25 | — | — |
| Butyl acetate | 5 | 5 | 5 | — | — | — |
| Methyl cellosolve | — | — | — | — | 15 | — |
| Methyl cellosolve acetate | — | — | — | — | — | 25 |
| Ethyl cellosolve | 10 | — | — | — | 25 | — |
| Ethyl cellosolve acetate | — | 10 | — | 15 | — | — |
| Butyl cellosolve | — | — | 10 | — | 10 | — |
| Butyl cellosolve acetate | 15 | — | — | — | — | 25 |

Plastics molded products coated with conductive primers or conductive primer surface paints which were compounded as hereabove mentioned have met the under-mentioned requirements on whichever resin aforementioned:

(1) The paint shall not attack the surface and the interior of the plastics.

(2) It shall be excellent in the layer adhesion of the coating after finish coating (not stripped when subjected to 1 mm 100 masu tape release test).

(3) It shall form a tough coating (giving only small shrinkage and so small internal strain, when forming film).

(4) It shall be quick-drying, thus permitting finish coating by wet-on-wet way.

(5) Its coating shall be highly flexible and so strong to physical impact (impact and pitching resistances).

(6) Its coating shall be excellent in resistance to water (sticking property) and heat (including heating cycle resistance).

(7) It shall enable attainment of excellent coating efficiency (sticking efficiency, following around property, etc.) in static coating.

(COMPARATIVE EXAMPLE)

When merely the finish coating of the embodiment was made on a polyacetal resin plate without using this invention's conductive primer for reference sake and this coating was subjected to a bond strength test (1 mm 100 masu tape release), it was all stripped off.

Results of similar stripping tests conducted with primers prepared from the conductive primer of this invention (Example 1) comprising components A, B, C, D and E by removing either one of components A, B, C, D and E are given as follows in terms of respective mean residual sticking rate (number of residual masu per 100):

| When it did not contain A | 0/100 masu |
| When it did not contain B | approx. 20/100 masu |
| When it did not contain C | approx. 30/100 masu |
| When it did not contain D | approx. 10/100 masu |
| When it did not contain E | 100/100 masu |

(However, the sticking efficiency obtained when it did not contain E was approx. 30% of the sticking efficiency achieved in the embodiment.)

As hereabove-described, the conductive primer or conductive primer surfacer paint of this invention, whose essential coating forming components comprises (A) polyurethane base resin, (B) ring opening expansive spiro-orthoester base resin, (C) cellulose delivative, (D) hydroxyl group containing reactive surface active agent and (E) a conductive material, shows high coating stickiness to plastic surfaces with high crystallinity or low surface polarity, thus obviating the need for conventional chemical and physical surface treating processes, excels in layer adhesion to various finish coating paints, thus giving high static coating efficiency (sticking efficiency, following around property, etc.) at the static coating time of various finish coating paints, and is, therefore, very useful as a conductive primer or conductive primer surfacer paint for polyacetal resins, polyester resins (polyethylene terephthalate, polybutylene terephthalate, fully aromatic polyester, etc.), etc.; thus, it enables providing excellent coated plastics molded products.

We claim:

1. An electrically conductive coating composition for a primer or a surfacer part for a plastic article which comprises:
   (A) between 50 to 97 weight percent of a polyurethane resin having a mean molecular weight between about 2,000 to 10,000;
   (B) between 2 to 40 weight percent of a ring-openable spiro-ortho-ester having a spiro-ortho-esterification degree of between 250 to 500 g/eq, and an epoxy value of between 0 to 5.0 g/eq;
   (C) between 0.05 to 1 weight percent of a cellulose derivative which is at least one selected from the group consisting of cellulose acetate propionate, cellullose butylate, cellulose acetate propionate, cellulose acetate butylate, and cellulose nitrate;
   (D) between 0.05 to 1.0 weight percent of a hydroxy-containing fluoride or silicone based surfactant; and
   (E) an electrically conductive material in an effective amount to achieve a surface resistance value of less than $10^{13}$ Ωcm, said electrically conductive material being at least one selected from the group consisting of carbon, titanium oxide, zinc oxide, antimony trichloride, graphite, tertiary ammonium salt compounds, metal coated fillers, and metal powders.

2. A plastic molded article coated with the coating composition as defined in claim 1.

3. An electrically conductive coating composition for a plastic article which comprises:
   (A) between 50 to 97 weight percent of a polyurethane resin having a mean molecular weight between about 2,000 to 10,000;
   (B) between 2 to 40 weight percent of a ring-openable spiro-ortho-ester having a spiro-ortho-esterification degree of between 250 to 500 g/eq, and an epoxy value of between 0 to 5.0 g/eq;
   (C) between 0.05 to 1 weight percent of a cellulose derivative which is at least one selected from the group consisting of cellulose acetate propionate, cellullose butylate, cellulose acetate propionate, cellulose acetate butylate, and cellulose nitrate;
   (D) between 0.05 to 1.0 weight percent of a hydroxy-containing fluoride or silicone based surfactant; and
   (E) an electrically conductive material in an effective amount to achieve a surface resistance value of less than $10^{13}$ Ωcm.

4. A coated plastic article having a surface coating which comprises:
- (A) between 50 to 97 weight percent of a polyurethane resin having a mean molecular weight between about 2,000 to 10,000;
- (B) between 2 to 40 weight percent of a ring-openable spiro-ortho-ester having a spiro-ortho-esterification degree of between 250 to 500 g/eq, and an epoxy value of between 0 to 5.0 g/eq;
- (C) between 0.05 to 1 weight percent of a cellulose derivative which is at least one selected from the group consisting of cellulose acetate propionate, cellullose butylate, cellulose acetate propionate, cellulose acetate butylate, and cellulose nitrate;
- (D) between 0.05 to 1.0 weight percent of a hydroxy-containing fluoride or silicone based surfactant; and
- (E) an electrically conductive material in an effective amount to achieve a surface resistance value of less than $10^{13}$ $\Omega$cm.

* * * * *

UNITED STATES PATENT AND TRADEMARK OFFICE
CERTIFICATE OF CORRECTION

PATENT NO. : 4,971,727

DATED : November 20, 1990

INVENTOR(S) : Takahashi et al

It is certified that error appears in the above-identified patent and that said Letters Patent is hereby corrected as shown below:

Column 1, line 34, after "the" change "increase" to --increased--;
        line 35, after "treatments" insert --)-- and after "the" (second occurrence) delete "deteriorated" and insert --deterioration--;
        line 47, after "Its" delete "coating's layer";
        line 50, after "provide" insert --a--;
        line 53, after "it" change "permit" to --permits--;
        line 54, after "by" insert --a--;
        line 54, after "wet-on-wet" delete "way" and insert --technique--;
        line 55, after "strong" delete "to" and insert --against--;
        line 56, after "resistance)" delete "being" and insert --and is--.

Column 2, line 22, after "(A)" insert --a-- and change "Polyurethane" to --polyurethane--;

line 25, after "(C)" insert --a-- and change "Cellulose" to --cellulose--;
        line 26, after "(D)" insert --a-- and change "Hydroxyl" to --hydroxyl--;
        line 28, after "(E)" insert --a-- and change "Conductive" to --conductive--;

line 55, after "with" insert --a--;
        line 63, after "its" delete "opened ring" and insert --ring-opened--;

UNITED STATES PATENT AND TRADEMARK OFFICE
CERTIFICATE OF CORRECTION

Page 2 of 2

PATENT NO. : 4,971,727
DATED : November 20, 1990
INVENTOR(S) : Takahashi et al It is certified that error appears in the above-identified patent and that said Letters Patent is hereby corrected as shown below:

Column 3, line 5, after "provides" insert --a--;
   line 12, after "with" and before "degree" insert --a--;
   line 22, after "having" insert --a--.

Column 4, line 4, after "around" delete "mold product" and insert --the molded product's--;
   line 45, after "(D)" delete "of";
   line 46, delete "those above-mentioned induced";
   line 47, after "after" delete "its";
   line 49, delete "composing components".

Column 5, line 22, after "with" insert --a--;
   line 40, delete "(" before "composing".

Column 6, line 9, change "amilack" to --Amilack--.

Signed and Sealed this

Fifteenth Day of September, 1992

Attest:

DOUGLAS B. COMER

*Attesting Officer*   *Acting Commissioner of Patents and Trademarks*